United States Patent Office 3,808,313
Patented Apr. 30, 1974

3,808,313
SULFONAMIDE AND NITROIMIDAZOLE COMPOSITIONS FOR CONTROL OF PASTEURELLA INFECTIONS IN WARM BLOODED ANIMALS AND METHODS OF USE
Richard Jay Shirk, Trenton, and Gordon Arthur Kemp, Princeton, N.J., assignors to American Cyanamid Company, Stamford, Conn.
No Drawing. Filed Mar. 8, 1971, Ser. No. 122,199
Int. Cl. A61k 27/00
U.S. Cl. 424—229          7 Claims

ABSTRACT OF THE DISCLOSURE

A compound selected from the group consisting of 2-amino-5-(5 - nitro-1-substituted-2-imidazolyl)-1,3,4-thiadiazoles and oxadiazoles when combined with a sulfonamide results in a composition demonstrating a synergistic effect in the control of Pasteurella infections in warm-blooded animals.

BRIEF SUMMARY OF THE INVENTION

The present invention relates to novel synergistic compositions, effective for controlling Pasteurella infections in warm-blooded animals, containing (1) a compound selected from the group consisting of 2-amino-5-(5-nitro-1-substituted-2-imidazolyl)-1,3,4-thiadiazoles and oxadiazoles and (2) a sulfonamide. The invention also relates to a novel method for controlling Pasteurella infections in warm-blooded animals comprising, administering to said animal hosts therapeutically effective quantities of the above-said synergistic composition alone or admixed with a suitable carrier.

DETAILED DESCRIPTION OF THE INVENTION

Although the pathogenicity of Pasteurella organisms for warm-blooded animals has been recognized for about seven decades there is still no entirely satisfactory method for controlling Pasteurella infections in such animals. Moreover, there is no entirely satisfactory method of immunizing warm-blooded animals against attack from these microorganisms.

As early as 1880, Louis Pasteur developed a vaccine which was partially successful in protecting chickens against Pasteurella multocida the causative agent for fowl cholera. However, protection was short lived and other methods of control have been sought. In recent years, sulfa drugs and a nitrofuran, have been used to combat fowl cholera and other Pasteurella infections but these treatments have had only very limited success. If, therefore, a method could be provided whereby effective control of Pasteurella infections was obtained, such method would be most desirable.

Among the more important species of Pasteurella are multocida, hemolytica, pestis, tularensis and pseudotuberculosis.

Pasteurella pseudotuberculosis causes pseudotuberculosis in rodents, especially guinea pigs. The disease may follow a chronic course or may be an acute septicemia.

Susceptible to the organism are turkeys, rams, silver foxes, swine, mice, wild rats, dogs, cats, and horses.

Acute Pasteurella multocida infections are generally characterized by a septicemia accompanied by bloodvascular congestion, enteritis and submucous and subserous hemorrhage.

The organism is the causative agent for fowl cholera and is frequently responsible for serious losses in flocks of chickens, ducks, geese and turkeys. Outbreaks of the disease have likewise been reported in flocks of wild ducks and pheasants.

This organism is also known to produce hemorrhagic septicemia typified by pleuropneumonia in cattle, sheep, swine, rabbits, mink and other warm-blooded animals.

Pasteurella hemolytica, another organism of the Pasteurella family, produces a diffuse pneumonia in sheep and cattle and may be marked by a fibrinous pleurisy with adhesions.

Pasteurella pestis has been associated with the bubonic plague and is pathogenic to man and many species of rodents including the rat, squirrel, rabbit and wild guinea pig. Pasteurella pestis infections have also been reported in cats, dogs, horses, cattle, sheep, goats, and wild birds.

Pasteurella tularensis has been found to produce natural infection in wild rabbits and hares throughout the United States; ground squirrels in California and Utah; beaver in Montana; chipmunk and sheep in Idaho; quail and grouse in Minnesota; wild rabbits in Japan, Canada, and Norway; wild rats and mice in California; and water rats in Russia. It is also known to infect dogs, foxes and carnivora that have eaten infected rabbits. Tularemia is a fatal septicemia in rodents. White mice, rabbits, cotton rats, hamsters, and guinea pigs are all susceptible.

Surprisingly, we have now discovered a method of and synergistic composition for the effective control of Pasteurella infections in warm-blooded animals. In its broadest aspects, the present invention involves the treatment of warm-blooded animals with a therapeutically effective amount of a composition containing (1) a compound having the formula:

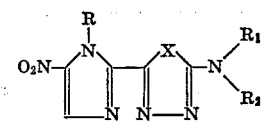

wherein X is sulfur or oxygen; R is a member selected from the group consisting of loweralkyl $C_1$–$C_4$ and preferably methyl or ethyl, hydroxy loweralkyl such as hydroxymethyl, hydroxyethyl or hydroxypropyl and $R_1$ and $R_2$ each represent hydrogen or lower alkanoyl; and (2) a sulfonamide, preferably selected from the group consisting of sulfamethazine, sulfamerazine, sulfaguanidine, sulfadiazine, sulfanilamide, sulfathiazole, sulfaquinoxaline and 3-sulfanilamido-6-ethoxypyridizine.

Advantageously, the compositions of the present invention can be administered to warm-blooded animals admixed with their feed or as a top dressing for the feed. They may also be made up in tablets, capsules, boluses, pills and the like or as drenches or liquid suspensions and orally administered to the animals on an individual basis. If desired, the synergistic compositions of the present invention may also be prepared as injectable solutions and administered parenterally to the animal host.

When administered in the animal feed, we have found that generally from about 6.25 to 100 p.p.m. and preferably 12.5 to 50 p.p.m. of the nitroimidazolyl thiadiazole or oxadiazole and from about 31.5 to 1000 p.p.m. and preferably 125 to 550 p.p.m. of the sulfonamide, gives excellent control of Pasteurella infections. If administered as a single oral dose, generally from 2.5 to 40 mg./kg. of body weight and preferably 5 to 20 mg./kg. of the nitroimidazoyl thiadiazole or oxadiazole and from 40 to 80 mg./kg. of body weight of the sulfonamide is effective for controlling Pasteurella infections in said animals. Similar dosages are also effective when the compositions are administered parenterally to the animal hosts.

DESCRIPTION OF THE PREFERRED EMBODIMENTS

In all of the following examples, the poultry diet set forth below was employed unless it is expressly stated to the contrary.

POULTRY DIET

|  | Percent |
|---|---|
| Ground yellow corn | 53.4 |
| Soybean oil meal (50% protein) | 28.0 |
| Menhaden fish meal (60% protein) | 5.0 |
| Corn gluten meal | 5.0 |
| Dehydrated alfalfa meal | 2.0 |
| Stabilized fat | 4.0 |
| Dicalcium phosphate | 1.2 |
| Calcite limestone | 0.5 |
| NaCl | 0.3 |
| Trace minerals + 2% zinc | 0.1 |
| Vitamin/amino acid pre-mix | 0.5 |
|  | 100.0 |

VITAMIN/AMINO ACID PRE-MIX FOR DIET

| | | |
|---|---|---|
| BHT | mg | 125 |
| dl-Methionine | mg | 500 |
| Vitamin A | I.U. | 3300 |
| Vitamin $D_3$ | I.C.U. | 1100 |
| Vitamin E | I.U. | 2.2 |
| Vitamin $B_{12}$ | mcg | 11.0 |
| Riboflavin | mg | 4.4 |
| Niacin | mg | 27.5 |
| Panthothenic acid | mg | 8.8 |
| Choline chloride | mg | 500.0 |
| Folic acid | mg | 1.43 |
| Menadione Na. bisulfate | mg | 1.10 |
| Ground yellow corn to 5 gms. | | |

Example 1

Six-day old chicks were removed from the 95° F. holding room to the test room (maintained at 80–82° F.) and distributed into uniform weight groups of 10 to 20 birds each. As each group was assembled it was placed in an individual cage of a battery consisting of five such cages in tiers. After the birds were grouped and assigned to cages they were given water and the above diet ad lib. The following day the birds were treated and infected; they were continued on the untreated diet throughout the remainder of the test, which was 12 days postinfection. Birds were treated with the indicated drug by gavage as a single dose of 0.5 ml. immediately prior to infection. The indicated drug levels were prepared by suspending or dissolving the drug in sterile distilled water containing 0.1% agar.

TABLE I.—EXPERIMENTAL *PASTEURELLA MULTOCIDA* INFECTION IN WEEK-OLD CHICKS—TITRATION DATA

| | | Survivors/total chicks on test—12 days postinfection | | | | | | | | | | | |
|---|---|---|---|---|---|---|---|---|---|---|---|---|---|
| | | Test number | | | | | | | | | | Summary | |
| Infection route | Dilution | 1 | 2 | 4 | 5 | 8 | 12 | 13 | 14 | 15 | 16 | 17 | S/T | Percent S |
| Air Sac | $10^{-2}$ | 0/20 | 4/20 | 0/20 | 1/20 | | | | | | | | 5/80 | 6 |
| | $10^{-3}$ | 0/20 | 2/20 | 1/20 | 0/20 | 2/20 | 3/20 | 0/20 | | 0/20 | 0/20 | 1/20 | 9/220 | 4 |
| | $10^{-4}$ | 0/20 | 2/20 | 1/20 | 0/20 | | | | | | | | 3/80 | 4 |
| | $10^{-5}$ | 0/20 | 2/20 | 1/20 | 3/20 | 0/20 | 5/20 | 0/20 | | 0/20 | 0/20 | 5/20 | 2/20 | 18/220 | 8 |
| | $10^{-6}$ | 0/20 | 7/20 | 2/20 | 1/20 | | | | | | | | 10/80 | 13 |
| | $10^{-7}$ | 3/20 | 6/20 | 8/20 | 11/20 | 6/20 | | | 14/20 | 9/20 | 7/20 | 8/20 | 72/180 | 40 |
| | $10^{-9}$ | | | | | 18/20 | | | | | 20/20 | 20/20 | 58/60 | 97 |

Infection: The seven-day old chicks were infected by injecting into the left air sac 0.2 ml. of a five-hour *P. multocida* culture diluted $10^{-3}$ in trypticase soy broth. Plate counts obtained by counting colonys on trypticase soy agar indicated that in this series of 15 tests the average infective dose was $11 \times 10^4$ (range 5 to $25 \times 10^4$) colony forming units/chick. Data obtained are reported below.

The titration data summarized in Table I indicate the high virulence of the test organism *Pasturella multocida* when injected via air sac into chicks.

The data of Table II provide efficacy data obtained with graded levels of test drugs administered alone and establish a basis for comparison with the drug combinations of the present invention which are presented in the ensuing examples.

TABLE II.—EVALUATION OF SELECTED COMPOUNDS AGAINST AN EXPERIMENTAL PASTEURELLA MULTOCIDA INFECTION IN WEEK-OLD CHICKS

Survivors/Total Chicks on Test—12 Days Postinfection

| Compound | Single oral dose, mg./kg. | 1 12-19 | 2 1-9 | 4 1-30 | 5 2-6 | 7 5-22 | 8 9-18 | 10-16 | 12 10-23 | 13 | 14 11-27 | 15 12-4 | 16 2-5 | 17 2-19 | 18 3-4 | 19 3-18 | 20 3-25 | Summary S/T | Percent S |
|---|---|---|---|---|---|---|---|---|---|---|---|---|---|---|---|---|---|---|---|
| 2-sulfanilamido-4,6-dimethylpyrimidine | 320 | | | | | | | | | | 13/20 | | | | | | | 13/20 | 65 |
|  | 160 | | | | | | | | | | 11/20 | | | | 17/20 | 11/20 | 11/20 | 28/40 | 70 |
|  | 80 | | | | | | | | | | 7/20 | 8/20 | | | | 11/20 | 11/20 | 37/80 | 45 |
|  | 40 | | | | | | | | | | 2/20 | 2/20 | | | 3/20 | 1/20 | 3/20 | 9/100 | 9 |
|  | 20 | | | | | | | | | | 0/20 | 0/20 | | | | | | 0/40 | 0 |
|  | 10 | | | | | | | | | | 0/20 | 0/20 | | | | | | 0/20 | 0 |
| Chlortetracycline hydrochloride | 80 | 15/20 | 15/20 | | 17/20 | | 13/20 | 15/20 | 14/20 | | | 20/20 | | | | | | 86/100 | 86 |
|  | 40 | 19/20 | 14/20 | | 13/20 | | 13/20 | 12/20 | 6/20 | | | 15/20 | | | | | | 118/160 | 74 |
|  | 20 | 16/20 | 11/20 | | 9/20 | | 9/20 | 10/20 | 1/20 | | | 9/20 | | | | | | 76/160 | 48 |
|  | 10 | 11/20 | 4/20 | | 1/20 | | 3/20 | 8/20 | 1/20 | | | 3/20 | | | | | | 28/100 | 28 |
|  | 5 | 3/20 | 4/20 | | 1/20 | | 1/20 | | 1/20 | | | 0/20 | | | | | | 16/140 | 11 |
|  | 2.5 | 1/20 | 0/10 | | | | | | | | | | | | | | | 1/40 | 3 |
|  | 1.25 | 0/20 | | | | | | | | | | | | | | | | 0/20 | 0 |
| 1,3,4-thiadiazole, 2-amino-5-(1-methyl-5-nitro-2-imidazolyl) | 80 | 10/10 | 10/10 | 10/10 | 10/10 | | | | | | | | | | | | | 40/40 | 100 |
|  | 40 | 10/10 | 4/10 | 10/10 | 4/10 | | | | | | | | | | | | | 73/80 | 91 |
|  | 20 | 9/10 | 3/10 | 3/10 | 3/10 | | | | | | | | | | | | | 69/90 | 77 |
|  | 10 | 3/10 | 2/10 | 1/10 | 0/10 | | | | | | 38/40 | | | 20/20 | 20/20 | 19/20 | 20/20 | 211/250 | 84 |
|  | 7.5 | 5/10 | 0/10 | 0/10 | 0/10 | | | | | | 27/40 | | 18/20 | 17/20 | 14/20 | 16/20 | 19/20 | 167/250 | 67 |
|  | 5 | | | | | | | | 20/20 | | 7/40 | | 6/20 | 11/20 | 12/20 | 4/20 | 7/20 | 64/180 | 36 |
|  | 1.25 | | | | | | | | | | | | | | 4/20 | 3/20 | 3/20 | 10/60 | 17 |
| Acetamide, N-[5-(1-methyl-5-nitro-2-imidazolyl)-1,3,4-thiadiazol-2-yl] | 160 | 10/10 | 10/10 | 8/10 | | | | | | | | | | | | | | 10/10 | 100 |
|  | 80 | 10/10 | 6/10 | 10/10 | | | | | | | | | | | | | | 38/40 | 95 |
|  | 40 | 5/10 | 10/10 | 2/10 | | | | | | | | | | | | | | 25/40 | 63 |
|  | 20 | | | 0/10 | | | | | | | | | | | | | | 7/30 | 23 |
|  | 10 | | 1/10 | 0/10 | | | | | | | | | | | | | | 3/30 | 10 |
|  | 5 | | 1/10 | 0/10 | | | | | | | | | | | | | | 2/30 | 7 |
| 1,3,4-oxadiazole, 2-amino-5-(1-methyl-5-nitro-2-imidazolyl) | 160 | | 10/10 | 8/10 | | | | | | | | | | | | | | 10/10 | 100 |
|  | 80 | | 9/10 | 4/10 | | | | | | | | | | | | | | 17/20 | 85 |
|  | 40 | | 4/10 | 0/10 | | | | | | | | | | | | | | 8/20 | 40 |
|  | 20 | | 2/10 | 0/10 | | | | | | | | | | | | | | 2/20 | 10 |
|  | 10 | | 2/10 | 0/10 | | | | | | | | | | | | | | 2/20 | 10 |
|  | 5 | | 0/10 | 0/10 | | | | | | | | | | | | | | 0/20 | 0 |
| 1-imidazoleethanol, 2-(5-amino-1,3,4-thiadiazol-2-yl)-5-nitro- | 40 | | | 20/20 | | | | | | | | | | | | | | 20/20 | 100 |
|  | 20 | | | 15/20 | | | | | | | | | | | | | | 15/20 | 75 |
|  | 10 | | | 15/20 | | | | | | | | | | | | | | 15/20 | 75 |
|  | 5 | | | 10/20 | | | | | | | | | | | | | | 10/20 | 50 |
| Infected—Untreated | | 0/20 | 2/20 | 1/20 | 0/20 | 5/40 | 2/20 | | 0/20 | | 0/20 | 0/20 | 0/20 | 1/20 | 1/20 | 1/20 | 1/20 | 18/320 | 6 |
| MST | | 1.2 | 1.9 | 1.2 | 1.9 | 1.5 | 1.2 | 3/20 1.6 | 1.2 | | 1.0 | 1.1 | 1.2 | 1.9 | 1.9 | 1.8 | 1.6 | 1.5 | |
| Infecting dose ×10⁴ | | .25 | 25 | 13 | | 12 | 14 | 5 | 10 | | 5 | 6 | 7 | 13 | 10 | 14 | 11 | 11 (5–25) | |
| Normal | | 20/20 | 20/20 | 20/20 | 20/20 | 20/20 | 20/20 | 20/20 | 20/20 | | 20/20 | 20/20 | 20/20 | 20/20 | 20/20 | 20/20 | 20/20 | 300/300 | 100 |

See notes at end of Table III.

Example 2

Following the procedure of Example 1 above, the compound 2 - amino - 5 - (1 - methyl-5-nitro-2-imidazolyl) 1,3,4 - thiadiazole, identified as compound A, is used alone and in combination with chlortetracycline, identified and B, and 2-sulfanilamido-4-6-dimethylpyrimidine, identified as C, against Pasteurella infections in chicks. From the data in Table III below, it can be seen that the combination of the nitroimidazolyl-thiadiazole with chlortetracycline does not produce a synergistic effect when used to control Pasteurella infections in poultry. However, from the data in Table IV it is exceedingly clear that when the nitroimidazolyl-thiadiazole is used in combination with 2-sulfanilamido-4-6-dimethylpyrimidine there is obtained a very pronounced enhancement in the efficacy of the drugs against Pasteurella infections in poultry.

TABLE III.—EVALUATION OF DRUGS IN COMBINATION AGAINST A *PASTEURELLA MULTOCIDA* INFECTION IN WEEK-OLD CHICKS

| Treatment: | S/T* Test number 8 | 12 | 13 | Total | Percent S, total | MST** |
|---|---|---|---|---|---|---|
| A = 2-amino-5-(1-methyl-5-nitro-2-imidazolyl)-1,3,4-thiadiazole: Mg./kg.—SOD: | | | | | | |
| 40 | 20/20 | | | 20/20 | 100 | |
| 20 | 20/20 | 20/20 | | 40/40 | 100 | |
| 10 | 20/20 | 19/20 | 20/20 | 59/60 | 98 | 5.0 |
| 5 | 15/20 | 19/20 | 14/20 | 48/60 | 80 | 4.7 |
| 2.5 | | 13/20 | 4/20 | 17/40 | 43 | 3.1 |
| B = Chlortetracycline hydrochloride: Mg./kg.—SOD: | | | | | | |
| 40 | 13/20 | 15/20 | 14/20 | 42/60 | 70 | 3.5 |
| 20 | 13/20 | 12/20 | 6/20 | 31/60 | 52 | 3.8 |
| 10 | 3/20 | 10/20 | 1/20 | 14/60 | 23 | 2.7 |
| 5 | 1/20 | 8/20 | 1/20 | 10/60 | 17 | 2.2 |
| 2.5 | | | 0/20 | 0/20 | 0 | 1.7 |
| A plus B: Mg./kg.—SOD: | | | | | | |
| A20+B20 | 20/20 | 20/20 | | 40/40 | 100 | |
| A10+B10 | 20/20 | 19/20 | 18/20 | 57/60 | 95 | 2.3 |
| A5+B5 | 18/20 | 17/20 | 14/20 | 49/60 | 82 | 3.5 |
| A2.5+B2.5 | 5/20 | 10/20 | 2/20 | 17/60 | 28 | 2.7 |
| A1.25+B1.25 | | | 1/20 | 1/20 | 5 | 1.5 |
| Infected control: | | | | | | |
| 10⁻³ (control) | 2/20 | 3/20 | 0/20 | 5/60 | 8 | 1.3 |
| 10⁻⁵ | 0/20 | 5/20 | 0/20 | 5/60 | 8 | 2.3 |
| 10⁻⁷ | 6/20 | | | 6/20 | 30 | 1.9 |
| 10⁻⁹ | 18/20 | | | 18/20 | 90 | 2.5 |
| Normal | 20/20 | 20/20 | 20/20 | 60/60 | 100 | |

*S/T = Survivors/Total birds tested.
**MST = Mean Survival Time (days) of birds that died.

TABLE IV.—EVALUATION OF DRUGS IN COMBINATION AGAINST A *PASTEURELLA MULTOCIDA* INFECTION IN WEEK-OLD CHICKS

| Treatment: | S/T* Test number 19 | 20 | Total | Percent S | MST** |
|---|---|---|---|---|---|
| A = 2-amino-5-(1-methyl-5-nitro-2-imidazolyl)-1,3,4-thiadiazole: Mg./kg.—SOD: | | | | | |
| 10 | 19/20 | 20/20 | 39/40 | 98 | 6.0 |
| 5 | 16/20 | 19/20 | 35/40 | 88 | 3.8 |
| 2.5 | 4/20 | 7/20 | 11/40 | 28 | 2.5 |
| 1.25 | 3/20 | 3/20 | 6/40 | 15 | 2.6 |
| C = 2-sulfanilamido-4,6-dimethylpyrimidine: Mg./kg.—SOD: | | | | | |
| 80 | 11/20 | 11/20 | 22/40 | 55 | 3.6 |
| 40 | 1/20 | 3/20 | 4/40 | 10 | 3.2 |
| C plus A: Mg./kg.—SOD: | | | | | |
| 80+10 | 19/19 | 20/20 | 39/39 | 100 | |
| 80+5 | 18/20 | 20/20 | 38/40 | 95 | 5.0 |
| 80+2.5 | 19/20 | 19/20 | 38/40 | 95 | 6.0 |
| 80+1.25 | 17/20 | 18/20 | 35/40 | 88 | 6.6 |
| 40+10 | 20/20 | 20/20 | 40/40 | 100 | |
| 40+5 | 19/20 | 17/20 | 36/40 | 90 | 2.0 |
| 40+2.5 | 15/20 | 14/20 | 29/40 | 73 | 5.0 |
| 40+1.25 | 5/20 | 9/20 | 14/40 | 35 | 3.2 |
| Infected control | 2/20 | 1/20 | 3/40 | 8 | 1.7 |
| Normal | 20/20 | 20/20 | 40/40 | 100 | |

*S/T = Survivors/Total birds on test —12 days postinfection.
**MST = Mean Survival Time (days) of birds that died.

NOTE.—Average infective dose/bird was 13×10⁴ organisms.

Example 3

Six-day old chicks were removed from the 95° F. holding room to the test room (maintained at 80–82° F.) and distributed into uniform weight groups of 10 to 20 birds each. As each group was assembled it was placed in an individual cage of a battery consisting of five such cages in tiers. After the birds were grouped and assigned to cages they were given water but no diet for the next 26 hours.

Three hours before the infections, the starved birds were given diets containing appropriate levels of test drugs. After three hours feeding, the birds were infected and continued on the drug diets for five days at which time they again received the unmedicated control diet.

Infections were obtained by injecting into the left air sac of birds 0.2 ml. of a five-hour *P. multocida* culture diluted $10^{-3}$ in trypticase soy broth as described in Example 1 above.

In this series of tests to evaluate combinations of Compound A and sulfonamides, favorable interactions were demonstrated as indicated in the tables. In this series, Compound A had a median effective dose of 27 p.p.m. in the diet, sulfamethazine (C) 489 p.p.m. and sulfaethoxypyridazine (D) 249 p.p.m. A diet level of 12.5 p.p.m. of (A) was ineffective by itself but in combination with graded levels of the sulfonamides significantly reduced the median effective dose of both sulfamethazine and sulfaethoxypyridazine to 273 and 131 p.p.m. respectively. Similar results were obtained with N'-(6-ethoxy-4-pyrimidinyl) sulfanilamide (E).

These data confirmed the therapeutic advantage for use of a combination of sulfa and Compound A. The amount of sulfa drugs in combination with a no-effect level of (A) required to effect an $ED_{50}$ in this infection is about one-half that of the sulfa used alone.

TABLE V.—EXPERIMENTAL *PASTEURELLA MULTOCIDA* INFECTION IN WEEK-OLD CHICKS—EFFECT OF DRUG COMBINATIONS

| Diet treatment (p.p.m.) | Number of tests | Average feed consumption, g./kg./3 hrs. .3 to 0 hr. | Average drug consumption, mg./kg./3 hrs. .3 to 0 hr. | Survivors per total | Percent survivors | Median effective dose p.p.m. in diet $ED_{50}$ (95% confidence limits) |
|---|---|---|---|---|---|---|
| Compound A: | | | | | | |
| 100 | 1 | 104 | 10.4 | 20/20 | 100 | 27(24–30). |
| 50 | 9 | 113 | 5.7 | 170/180 | 94 | |
| 25 | 9 | 111 | 2.8 | 65/180 | 36 | |
| 12.5 | 9 | 111 | 1.4 | 13/180 | 7 | |
| 6.25 | 4 | 114 | 0.7 | 0/80 | 0 | |
| Compound C: | | | | | | |
| 500 | 4 | 112 | 56 | 42/80 | 55 | 489(343–692). |
| 250 | 4 | 112 | 28 | 4/80 | 5 | |
| 125 | 2 | 114 | 14 | 1/40 | 3 | |

TABLE V—Continued

| Diet treatment (p.p.m.) | Number of tests | Average feed consumption, g./kg./3 hrs. .3 to 0 hr. | Average drug consumption, mg./kg./3 hrs. .3 to 0 hr. | Survivors per total | Percent survivors | Median effective dose p.p.m. in diet ED₅₀ (95% confidence limits) |
|---|---|---|---|---|---|---|
| C plus A: | | | | | | |
| 500+25 | 2 | 105 | 53+2.6 | | 93 | 112 (0.01-207) plus 25 p.p.m. |
| 250+25 | 2 | 107 | 26+2.7 | 28/40 | 70 | |
| 125+25 | 2 | 105 | 13+2.6 | 24/40 | 60 | |
| 500+12.5 | 2 | 104 | 52+1.3 | 35/40 | 88 | 273 (205-357) plus 12.5 p.p.m. |
| 150+12.5 | 2 | 110 | 28+1.4 | 14/40 | 35 | |
| 125+12.5 | 2 | 111 | 14+1.4 | 5/40 | 13 | |
| 500+6.25 | 2 | 108 | 54+0.7 | 29/40 | 73 | 421 (245-750) plus 6.25 p.p.m. |
| 250+6.25 | 2 | 100 | 25+0.6 | 6/40 | 15 | |
| 125+6.25 | 2 | 108 | 14+0.7 | 0/40 | 0 | |
| Infected-untreated | 9 | 115 | | 3/180 | 2 | |
| Normal | 9 | 115 | | 179/179 | 100 | |

Compound A 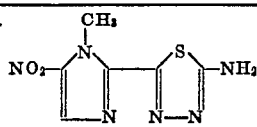 1,3,4-thiadiazole, 2-amino-5-(1-methyl-5-nitro-2-imidazolyl).

Compound B 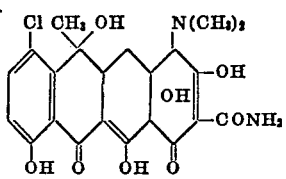 HCl = Chlortetracycline-hydrochloride.

Compound C 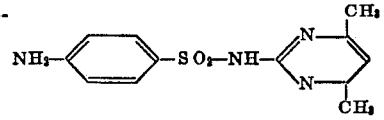 2-sulfanilamido-4,6-dimethylpyrimidine = Sulfamethazine.

Compound D 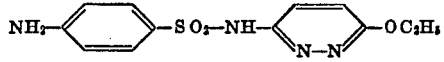 3-sulfanilamide-6-ethoxypyridazine.

Compound E 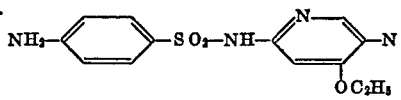 Sulfanilamide, N'-(6-ethoxy-4-pyrimidinyl).

TABLE VI.—EXPERIMENTAL *PASTEURELLA MULTOCIDA* INFECTION IN WEEK-OLD CHICKS—EFFECT OF DRUG COMBINATIONS

| Diet treatment (p.p.m.) | Number of tests | Average feed consumption, g./kg./3 hrs. .3 to 0 hr. | Average drug consumption, mg./kg./3 hrs. .3 to 0 hr. | Survivors per total | Percent survivors | Median effective dose, p.p.m. in diet ED₅₀ (95% confidence limits) |
|---|---|---|---|---|---|---|
| Compound A: | | | | | | |
| 100 | 1 | 104 | 10.4 | 20/20 | 100 | 27 (24-30). |
| 50 | 9 | 113 | 5.7 | 170/180 | 94 | |
| 25 | 9 | 111 | 2.8 | 65/180 | 36 | |
| 12.5 | 9 | 111 | 1.4 | 13/180 | 7 | |
| 6.25 | 4 | 114 | 0.7 | 0/80 | 0 | |
| Compound D: | | | | | | |
| 1,000 | 4 | 122 | 122 | 76/80 | 95 | 249 (206-300). |
| 500 | 5 | 116 | 58 | 78/100 | 78 | |
| 250 | 5 | 117 | 29.3 | 53/100 | 53 | |
| 125 | 5 | 122 | 15.3 | 21/100 | 21 | |
| 62.5 | 3 | 116 | 7.3 | 2/60 | 3 | |
| D plus A: | | | | | | |
| 1000+50 | 2 | 122 | 123+6.1 | 40/40 | 100 | |
| 500+50 | 2 | 120 | 60+6.0 | 40/40 | 100 | |
| 250+50 | 2 | 112 | 28+5.6 | 40/40 | 100 | |
| 125+50 | 2 | 124 | 13.3+6.2 | 38/40 | 95 | |
| 1,000+25 | 2 | 114 | 114+2.9 | 39/40 | 98 | 67 (24-103) plus 25 p.p.m. A. |
| 500+25 | 5 | 121 | 60.5+3.0 | 78/80 | 98 | |
| 250+25 | 4 | 121 | 30.3+3.0 | 75/80 | 94 | |
| 125+25 | 4 | 119 | 14.9+3.0 | 48/80 | 60 | |
| 62.5+25 | 2 | 120 | 7.5+3.0 | 23/40 | 58 | |
| 1,000+12.5 | 2 | 120 | 120+1.5 | 40/40 | 100 | 131 (98-164) plus 12.5 p.p.m. A. |
| 500+12.5 | 4 | 119 | 59.5+1.5 | 78/80 | 96 | |
| 250+12.5 | 4 | 110 | 27.5+1.4 | 60/80 | 75 | |
| 125+12.5 | 4 | 114 | 14.3+1.4 | 42/80 | 53 | |
| 62.5+12.5 | 2 | 114 | 7.1+1.4 | 9/40 | 23 | |
| 500+6.25 | 2 | 117 | 58.5+0.7 | 38/40 | 95 | 176 (96-319 plus 6.25 p.p.m. to 5.55. |
| 250+6.25 | 2 | 113 | 28.3+0.7 | 21/40 | 53 | |
| 125+6.25 | 2 | 109 | 13.6+0.7 | 17/40 | 43 | |
| 62.5+6.25 | 2 | 108 | 6.8+0.7 | 4/40 | 10 | |
| Infected-untreated | 9 | 115 | | 3/180 | 2 | |
| Normal | 9 | 115 | | 179/179 | 100 | |

TABLE VII.—EXPERIMENTAL *PASTEURELLA MULTOCIDA* INFECTION IN WEEK-OLD CHICKS—EFFECT OF DRUG COMBINATIONS

| Diet treatment (p.p.m.) | Number of tests | Average feed consumption, g./kg./3 hrs. .3 to 0 hr. | Average drug consumption, mg./kg./3 hrs. .3 to 0 hr. | Survivors per total | Percent survivors | Median effective dose, p.p.m. in diet ED₅₀ (95% confidence limits) |
|---|---|---|---|---|---|---|
| Compound A: | | | | | | |
| 100 | 1 | 104 | 10.4 | 20/20 | 100 | 27 (24–30). |
| 50 | 9 | 113 | 5.7 | 170/180 | 94 | |
| 25 | 9 | 111 | 2.8 | 65/180 | 36 | |
| 12.5 | 9 | 111 | 1.4 | 13/180 | 7 | |
| 6.25 | 4 | 114 | 0.7 | 0/80 | 0 | |
| Compound E: | | | | | | |
| 250 | 2 | 111 | 27.8 | 32/40 | 80 | 111 (77–173). |
| 125 | 2 | 116 | 14.5 | 21/40 | 53 | |
| 62.5 | 2 | 109 | 6.8 | 15/40 | 38 | |
| 31.25 | 2 | 103 | 3.2 | 1/40 | 3 | |
| E plus A: | | | | | | |
| 250+50 | 1 | 101 | 25.3+5.1 | 20/20 | 100 | |
| 125+50 | 1 | 102 | 12.8+5.1 | 19/20 | 95 | |
| 62.5+50 | 1 | 100 | 6.3+5.0 | 19/20 | | |
| 31.25+50 | 1 | 94 | 3.0+4.8 | 20/20 | 100 | |
| 250+25 | 1 | 108 | 27.0+2.7 | 20/20 | 100 | 23 (limits not calculable) plus 25 p.p.m. A. |
| 125+25 | 1 | 110 | 13.8+2.8 | 19/20 | 95 | |
| 62.5+25 | 1 | 105 | 6.6+2.6 | 16/20 | 80 | |
| 31.25+25 | 1 | 94 | 2.9+2.4 | 13/20 | 65 | |
| 250+12.5 | 1 | 94 | 23.5+1.2 | 20/20 | 100 | 60 (limits not calculable) plus 12.5 p.p.m. A. |
| 125+12.5 | 1 | 106 | 13.3+1.3 | 13/20 | 65 | |
| 62.5+12.5 | 1 | 108 | 6.8+1.4 | 10/20 | 50 | |
| 31.25+12.5 | 1 | 107 | 3.3+1.3 | 6/20 | 30 | |
| Compound B: | | | | | | |
| 200 | 2 | 115 | 23.0 | 39/40 | 98 | 66 (40–96). |
| 100 | 2 | 108 | 10.8 | 35/40 | 88 | |
| 75 | 1 | 117 | 8.8 | 15/20 | 75 | |
| 50 | 2 | 118 | 5.9 | 6/40 | 15 | |
| 25 | 1 | 109 | 2.7 | 1/20 | 5 | |
| Infected-untreated | 9 | 115 | | 3/180 | 2 | |
| Normal | 9 | 115 | | 179/179 | 100 | |

Example 4

The surprising enhancement in the effectiveness of the combination of nitroimidazolyl thiadiazoles or oxadiazoles with sulfonamides, over the individual components, for the control of fowl cholera in poultry is demonstrated by the following tests.

In these tests, weak-old chicks are divided into groups of 20, weighed as groups and placed in pens. Infections and treatments are made as described in Example 1, except that a variety of drugs are used alone and in combination with sulfonamides, to determine the efficacy of said drugs and drug combinations for controlling fowl cholera.

Data obtained are given in the tables below. These data demonstrate:

(1) That many antibacterials which are highly effective against a wide variety of bacterial infections in animals are not effective against Pasteurella infections in poultry, even when administered at relatively high levels, (2) These ineffective antibacterials are not made efficacious by the use of sulfonamides in combination therewith and, (3) That the efficacy of 2-amino-5-(1-methyl-5-nitro-2-imidazolyl)-1,3,4-thiadiazole is unexpectedly enhanced by the use thereof in combination with a sulfonamide.

TABLE VIII

| Compound | Single oral dose, mg./kg. | Survivors per total | Percent survivors |
|---|---|---|---|
| Uninfected-untreated | | 60/60 | 100 |
| Infected-untreated | | 2/60 | 3 |
| Tylosin | 40 | 1/60 | 5 |
| Penicillin G | 40 | 0/60 | 0 |
| Neomycin | 40 | 0/20 | 0 |
| Streptomycin | 40 | 0/20 | 0 |
| Furazolidone | 80 | 1/20 | 5 |
| Do | 160 | 3/20 | 15 |
| Compound C | 80 | 21/60 | 32 |
| Compound A | 1.25 | 6/20 | 30 |
| Compound C plus— | | | |
| Tylosin | 80+40 | 7/20 | 35 |
| Penicillin G | 80+40 | 8/20 | 40 |
| Neomycin | 80+40 | 8/20 | 40 |
| Streptomycin | 80+40 | 9/20 | 45 |
| Furazolidone | 80+80 | 9/20 | 45 |
| Do | 80+160 | 4/20 | 20 |
| Compound A | 80+1.25 | 20/20 | 100 |

Example 5

Following the procedure of Example 1 above, the compound 2-(5-amino-1,3,4-thiadiazol-2-yl)-5-nitro-1-imidazolethanol, identified as Compound F, is used alone and in combination with 2-sulfanilamido-4,6-dimethylpyrimidine, i.e. Compound C, against Pasteurella infection in chicks. The data obtained are reported in Table IX below and demonstrate the enhanced effect obtained with the combination.

TABLE IX

*Pasteurella multocida* RC 315 infection in week-old chicks effect of combinations of sulfamethazine and 2-(5-amino-1,3,4-thiadiazol-2-yl)-5-nitro-1-imidazolethanol

| | S/T | Percent S. |
|---|---|---|
| Normal | 20/20 | 100 |
| Infected-untreated | 0/20 | 0 |
| Compound C: | | |
| 80 mg./kg. | 9/20 | 45 |
| 40 mg./kg. | 4/20 | 20 |
| Compound F: | | |
| 10 mg./kg. | 20/20 | 100 |
| 5 mg./kg. | 20/20 | 100 |
| 2.5 mg./kg. | 15/20 | 75 |
| 1.25 mg./kg. | 9/20 | 45 |
| Compound C, 80 mg./kg. plus— | | |
| Compound F, 10 mg./kg. | 20/20 | 100 |
| Compound F, 5 mg./kg. | 20/20 | 100 |
| Compound F, 2.5 mg./kg. | 17/20 | 85 |
| Compound F, 1.25 mg./kg. | ¹18/20 | 90 |
| Compound C, 40 mg./kg. plus— | | |
| Compound F, 10 mg./kg. | 20/20 | 100 |
| Compound F, 5 mg./kg. | 20/20 | 100 |
| Compound F, 2.5 mg./kg. | 16/20 | 80 |
| Compound F, 1.25 mg./kg. | 8/20 | 40 |

[1] Significant at p=.05 over individual drug levels.

NOTE.—Conclusions: Indicates enhanced effect at the indicated levels.

We claim:

1. A synergistic composition for the control of Pasteurella infections in warm-blooded animals comprising (a) from 2.5 to 40 mg./kg. of animal body weight of a compound selected from the group having the formula:

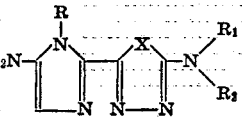

wherein X is sulfur or oxygen, R represents a member selected from the group consisting of lower alkyl $C_1$-$C_4$, and hydroxy lower alkyl having 1 to 4 carbon atoms and $R_1$ and $R_2$ each represent hydrogen or lower alkanoyl and (b) from 40 to 80 mg./kg. of animal body weight of a sulfonamide selected from the group consisting of sulfamethazine, sulfamerazine, sulfadiazine, sulfathiazole, sulfaquinoxaline, 3-sulfanilamido-6-ethoxypyridazine, N'-(6-ethoxy-4-pyrimidinyl)-sulfanilamide.

2. A composition according to claim 1 where, in the imidazolyl formula, R is methyl or hydroxyethyl, $R_1$ is hydrogen and $R_2$ is hydrogen or —CO—$CH_3$.

3. A medicated animal feed composition effective for controlling Pasteurella infections in animals ingesting said feed, comprising, an edible feedstuff, from 6.25 to 100 p.p.m. of a compound of the formula:

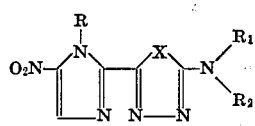

wherein X is sulfur or oxygen, R is a member selected from the group consisting of loweralkyl $C_1$-$C_4$ and hydroxy lower alkyl $C_1$-$C_4$ and $R_1$ and $R_2$ each represent hydrogen or lower alkanoyl and from about 31.5 to 1000 p.p.m. of a sulfonamide selected from the group consisting of sulfamethazine, sulfamerazine, sulfadiazine, sulfathiazole, sulfaquinoxaline, 3-sulfanilamido-6-ethoxypyridazine, N'-(6-ethoxy-4-pyrimidinyl)-sulfanilamide.

4. A medicated feed composition according to claim 3 where, in the imidazolyl formula, R is methyl or hydroxyethyl, $R_1$ is hydrogen and $R_2$ is hydrogen or —CO—$CH_3$.

5. A method for controlling Pasteurella infections in warm-blooded animals comprising, administering to a host animal a composition containing (a) from 2.5 to 40 mg./kg. of animal body weight of a compound having the formula:

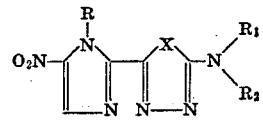

where X is sulfur or oxygen, R is loweralkyl $C_1$-$C_4$ and $R_1$ and $R_2$ are each selected from the group consisting of hydrogen and loweralkanoyl and (b) from 40 to 80 mg./kg. of animal body weight of a sulfonamide selected from the group consisting of sulfamethazine, sulfamerazine, sulfadiazine, 3-sulfanilamide-6-ethoxypyridazine, N'-(6-ethoxy-4-pyrimidinyl)-sulfanilamide.

6. A method according to claim 5 wherein the imidazolyl is 2-amino-5-(1-methyl-5-nitro-2-imidazolyl)-1,3,4-thiadiazole, the sulfonamide is sulfamethazine and the composition is administered as a single oral dose providing from 5 to 20 mg./kg. of body weight of the thiadiazole and from 40 to 80 mg./kg. of body weight of sulfamethazine.

7. A method according to claim 5 wherein the Pasteurella organism is *Pasteurella multocida* and the host animal is a fowl.

References Cited

Redin et al.: (98838p); Burden et al.: (98839q); Carvajal et al.: (98840h); Burden et al.: (98841j); Chem. Abst., vol. 72 (1970) (numbers in parentheses are abstract numbers).

Bachmann et al.: Chem. Abst., vol. 70 (1970), abst. No. 99075z.

SAM ROSEN, Primary Examiner

U.S. Cl. X.R.

424—270